(12) United States Patent
Kim (10) Patent No.: US 8,971,471 B2
(45) Date of Patent: Mar. 3, 2015

(54) PREDICTABLE CODING DELAY OVER COMMUNICATIONS NETWORKS

(75) Inventor: Junius Adonis Kim, Cincinnati, OH (US)

(73) Assignee: Imagine Communications Corp., Englewood, CO (US)

( * ) Notice: Subject to any disclaimer, the term of this patent is extended or adjusted under 35 U.S.C. 154(b) by 259 days.

(21) Appl. No.: 13/313,083

(22) Filed: Dec. 7, 2011

(65) Prior Publication Data

US 2013/0148768 A1 Jun. 13, 2013

(51) Int. Cl.
*H04L 7/00* (2006.01)

(52) U.S. Cl.
USPC ............ 375/372; 375/354; 711/156; 711/204

(58) Field of Classification Search
USPC .................. 375/354, 372; 711/100, 154–156, 711/167–169, 204, 213, 219, 1
See application file for complete search history.

(56) References Cited

U.S. PATENT DOCUMENTS

| | | | |
|---|---|---|---|
| 5,805,983 A | 9/1998 | Naidu et al. | |
| 6,005,872 A | 12/1999 | Bassi et al. | |
| 6,829,244 B1 * | 12/2004 | Wildfeuer et al. | ............ 370/412 |
| 6,862,298 B1 | 3/2005 | Smith et al. | |
| 7,310,423 B2 | 12/2007 | Hobrock et al. | |
| 7,366,270 B2 | 4/2008 | Tang et al. | |
| 7,920,081 B2 | 4/2011 | Waheed et al. | |
| 7,934,057 B1 * | 4/2011 | Raza | .............................. 711/131 |
| 7,940,667 B1 | 5/2011 | Coady et al. | |
| 7,953,122 B2 | 5/2011 | Ambilkar et al. | |
| 8,386,828 B1 * | 2/2013 | Ambatipudi et al. | ......... 713/500 |
| 2005/0220240 A1 * | 10/2005 | Lesso | ............................ 375/372 |
| 2006/0104397 A1 | 5/2006 | Lottis et al. | |
| 2008/0212690 A1 | 9/2008 | Loukas | |
| 2009/0228615 A1 * | 9/2009 | Beckert et al. | ................... 710/21 |
| 2012/0226884 A1 * | 9/2012 | Tokuhiro et al. | .............. 711/167 |
| 2012/0303994 A1 * | 11/2012 | Bauernfeind et al. | ........ 713/400 |
| 2013/0138897 A1 * | 5/2013 | Mirza | ........................... 711/154 |

FOREIGN PATENT DOCUMENTS

| | | |
|---|---|---|
| FR | 2 926 691 A1 | 7/2009 |
| WO | WO 01/37571 A1 | 5/2001 |

OTHER PUBLICATIONS

Int'l Search Report—4 pgs., Mar. 22, 2013, Harris Corporation.
Written Opinion—6 pgs., Mar. 22, 2013, Harris Corporation.

* cited by examiner

*Primary Examiner* — Dac Ha
(74) *Attorney, Agent, or Firm* — Tarolli, Sundheim, Covell & Tummino LLP (57) ABSTRACT

A decoder includes a buffer configured to incrementally transport a synchronous data stream through a path of the decoder. A control circuit is configured to control a depth parameter associated with the buffer and to provide a substantially predictable delay of the synchronous data stream through the path of the decoder.

18 Claims, 6 Drawing Sheets

PREDICTABLE CODING DELAY OVER COMMUNICATIONS NETWORKS

TECHNICAL FIELD

This disclosure relates to communications and more particularly to communications of synchronous data over a communications network.

BACKGROUND

A single frequency network (SFN) is a broadcast network where several radio frequency (RF) transmitters concurrently send the same signal over the same frequency channel. One goal of SFNs is efficient utilization of the radio spectrum, allowing a higher number of programs in comparison to traditional multi-frequency network (MFN) transmission. An SFN may also increase the coverage area and decrease the outage probability in comparison to the MFN, since the total received signal strength may increase to positions midway between transmitters.

Broadcasting from two or more nearby RF transmitters on the same frequency can lead to reception problems in the overlap areas—the areas in which the RF signal level from multiple transmitters is similar in strength. Broadcasting the same signal from two or more RF transmitters on the same frequency can produce a cascade of effects. For instance, listeners located closer to any one of the transmitters where the signal is significantly stronger (usually 6 dB or greater) may hear only the closer transmitter due to the "capture effect" of a receiver. Listeners located in "equal signal" areas or fringe areas can experience serious reception problems where transmitter footprints overlap.

For SFN to work effectively, the broadcast signal from each transmitter should arrive at the receiver at the same time. A signal leaving the control site can be subject to three delay factors: control to transmitter site network link path delay, the RF "flight time" in the air from the transmitter to the receiver, and the encode/decode delay of the source program material. For an effective SFN system, the delay factors must be either compensated for or well controlled.

SUMMARY

A substantially predictable coding delay is provided for communications networks. In one example, a decoder is provided that can include a buffer configured to incrementally transport a synchronous data stream through a path of the decoder. A control circuit can be configured to control a depth parameter associated with the buffer and to provide a substantially predictable delay of the synchronous data stream through the path of the decoder.

In another example, a device includes a decoder configured to decode synchronous data packets from a single frequency network (SFN). A first-in first-out (FIFO) circuit can be configured to introduce a substantially predictable delay for the synchronous data packets received from the decoder. A control circuit can be configured to adjust a depth parameter that is proportional to the delay, wherein the depth parameter is based in part on an average depth measurement of storage locations in the FIFO circuit that currently store the synchronous data packets.

In yet another example, a method includes storing a synchronous data stream from a single frequency network into a buffer. The method includes monitoring an average depth measurement relating to storage locations that are filled in the buffer by the synchronous data stream, wherein the average depth measurement is proportional to a delay in the buffer. The method also includes determining an error parameter that is a difference between the average depth measurement and a target parameter representing a desired delay and reducing the error parameter in order to control the delay.

DETAILED DESCRIPTION

This disclosure relates to a system and method for encoding data for transport over a communication link and then decoding to reproduce the data at the far-end of the respective link. The system and method disclosed herein can mitigate delay uncertainty by encoding and decoding data such that delay is predictable and precise. Thus, in one example a predictable delay is provided in the encoding and decoding of synchronous serial data. For example, the encoder and/or decoder portions of the communication link can employ control circuitry to operate a buffer to provide desired delay characteristics at both the transmit portion and the receive portion of the communications path. Thus, as used herein, the terms predictable and precise relate to how delay is controlled (e.g., held to a target amount) such that the delay is repeatable and similar across numerous data streams transported along the communications path. In one example, delay can be controlled by controlling the depth of data in the buffer.

Figure 1:
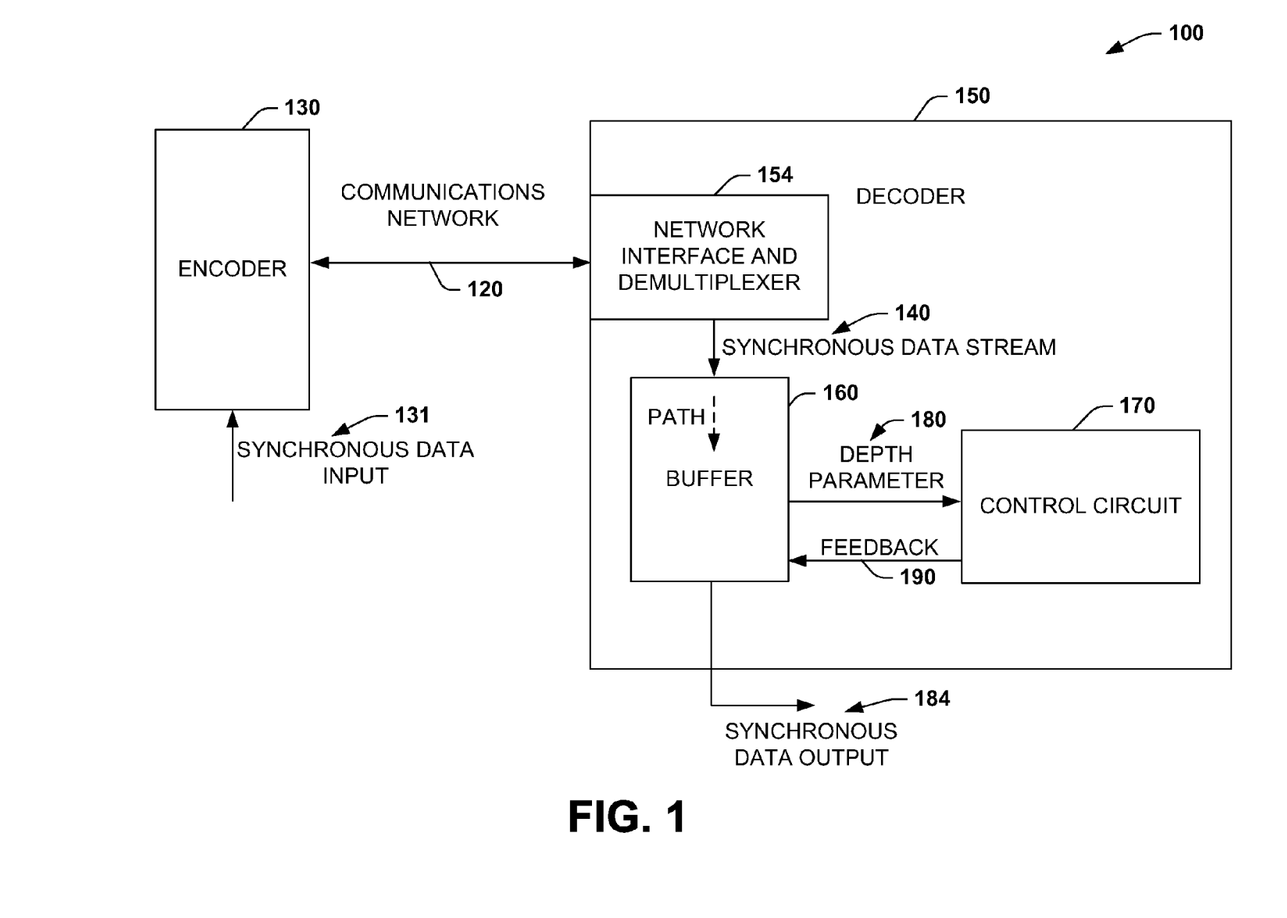
FIG. 1 illustrates an example of a system for providing a predictable coding delay for a communications network.

FIG. 1 illustrates an example of a system 100 for providing a predictable coding delay. An encoder 130 multiplexes or encodes synchronous data input 131 before transmitting to a decoder 150 via network 120. The synchronous data encoded 131 and decoded at 184 can be a standard data protocol such as a Project 23 or APCO-25 compatible digital voice circuit which uses 9.6 kbps per voice channel circuit, for example. The network 120 can be implemented as a SFN. The decoder 150 includes network interface and demultiplexer 154 that feeds a buffer 160 configured to incrementally transport the received synchronous data stream 140 through a path (shown as dotted arrow of data flow through buffer) of the decoder. A control circuit 170 can be configured to control a depth parameter 180 associated with the buffer 160 and to provide a substantially predictable delay of the synchronous data stream through the path of the decoder 150 and shown as synchronous data output 184. The depth parameter 180 can relate to how full or empty the buffer 160 is with respect to the synchronous data stream 140. Thus, the control circuit 170 can control how much of the synchronous data stream 140 resides in the buffer 160 by controlling the depth parameter. For example, the control circuit 170 can monitor an average indication of the depth parameters and control the depth parameter (e.g., via a controllable clock) to provide a predictable delay for the synchronous data stream as it moves through the path of the decoder 150.

In the example of FIG. 1, feedback 190 can be provided from the control circuit 170 to control the depth of data residing in the buffer 160, wherein depth of data can refer to how many storage locations in the buffer are filled or empty. Such feedback 190 can include one or more adjustable clocks, for example, that adjust the delay in continuous manner (e.g., how fast data is clocked out of buffer and without disruption to data stream). Additionally or alternatively, the feedback 190 can include writing or reading fill data to/from the buffer 160 in order to adjust the delay in a discontinuous or asynchronous manner with respect to a programmable clock described below with respect to FIG. 2. In this case, fill data is data written to or read from the buffer 160 merely to adjust the depth. If written to by the control circuit, the fill data is not related to the synchronous data stream 140. It is noted that the synchronous data stream 140 is shown as a dashed line to represent that other processing can occur in the decoder 150 before entry into the buffer 160. An example of such processing is described below with respect to FIG. 2. As will be described below with respect to FIG. 4, the encoder 130 can also include a buffer (e.g., see buffer 414 of FIG. 4) to facilitate providing a predictable delay over the communications network 120.

Figure 3:
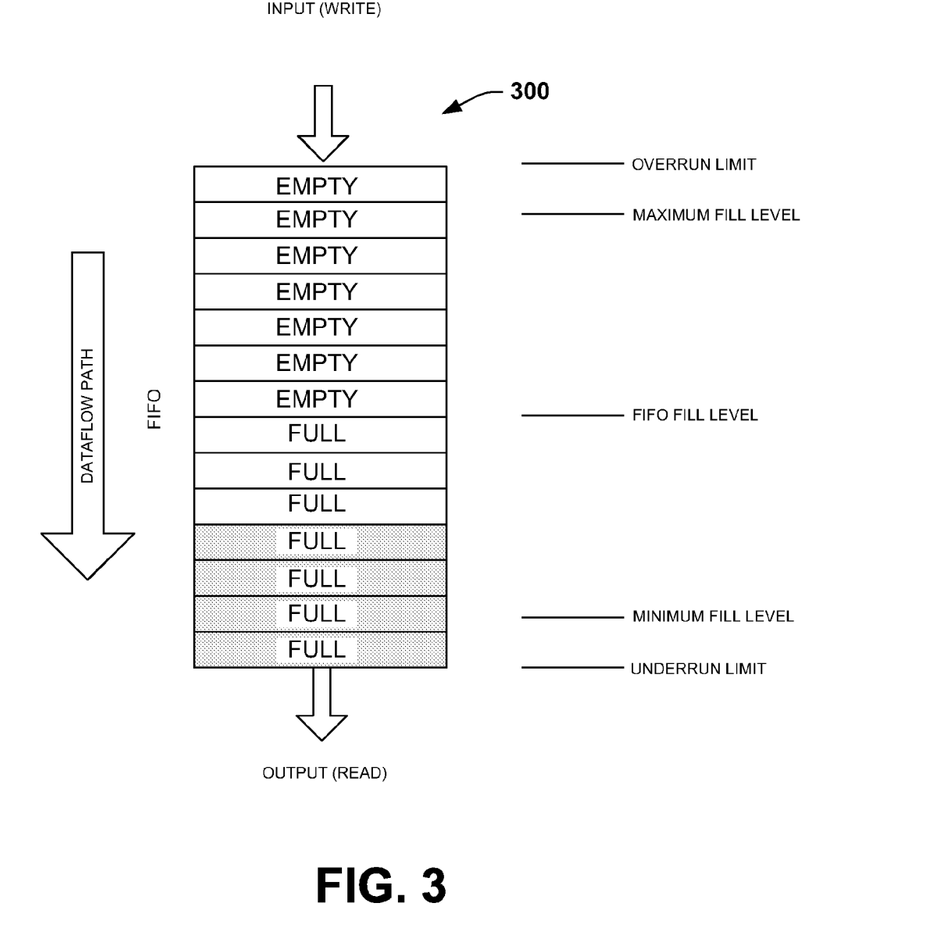
FIG. 3 illustrates an example of a first in first out buffer and thresholds for providing a predictable coding delay for a communications network.

In one example, the buffer 160 can be a first-in first-out (FIFO) circuit configured to clock the synchronous data stream 140 through the path of the buffer. The depth parameter 180 can be maintained such that a fill rate and a depletion rate of the buffer are maintained at about equal rates. For instance, the depth parameter 180 can be a fill level indicating a number of storage locations in the buffer 160 that have received at least a portion of the synchronous data stream 140. As shown in FIG. 3, the fill level can be assigned a threshold value that includes at least one of an underrun limit, a minimum fill level, a maximum fill level, or an overrun limit. As used herein, the terms "underrun", "overrun" refer to limits regarding the management of the FIFO. For example, if the FIFO is allowed to fill above its capacity this corresponds to an overrun, wherein if the FIFO is depleted to 0, this corresponds to an underrun. The maximum fill level is one less than the size of the FIFO and the minimum fill level is 1. Thus, the fill level should be kept equal to or less than the maximum fill level and equal to or greater than the minimum fill level. The delay associated with the buffer 160 can be increased by moving data into the buffer or be decreased by removing data from the buffer in an asynchronous manner to buffer clock operations. This type of operation results in a dataflow discontinuity which causes a data error.

The delay can also be increased or decreased by adjusting clock frequencies to the buffer 160 via the feedback 190. As another example, the control circuit 170 can process an average depth measurement of storage locations in the buffer and adjust the clock frequencies to the buffer 160 to control the delay based on the average depth measurement. Thus, the control circuit 170 can determine a target delay for the buffer 160 and determine a delay error that is a difference between a measured delay for the buffer and the target delay, wherein the control circuit mitigates the delay error by adjusting clock frequencies to the buffer in view of the average depth measurement. This type of operation preserves dataflow continuity and is hitless (e.g., no data error).

Figure 2:
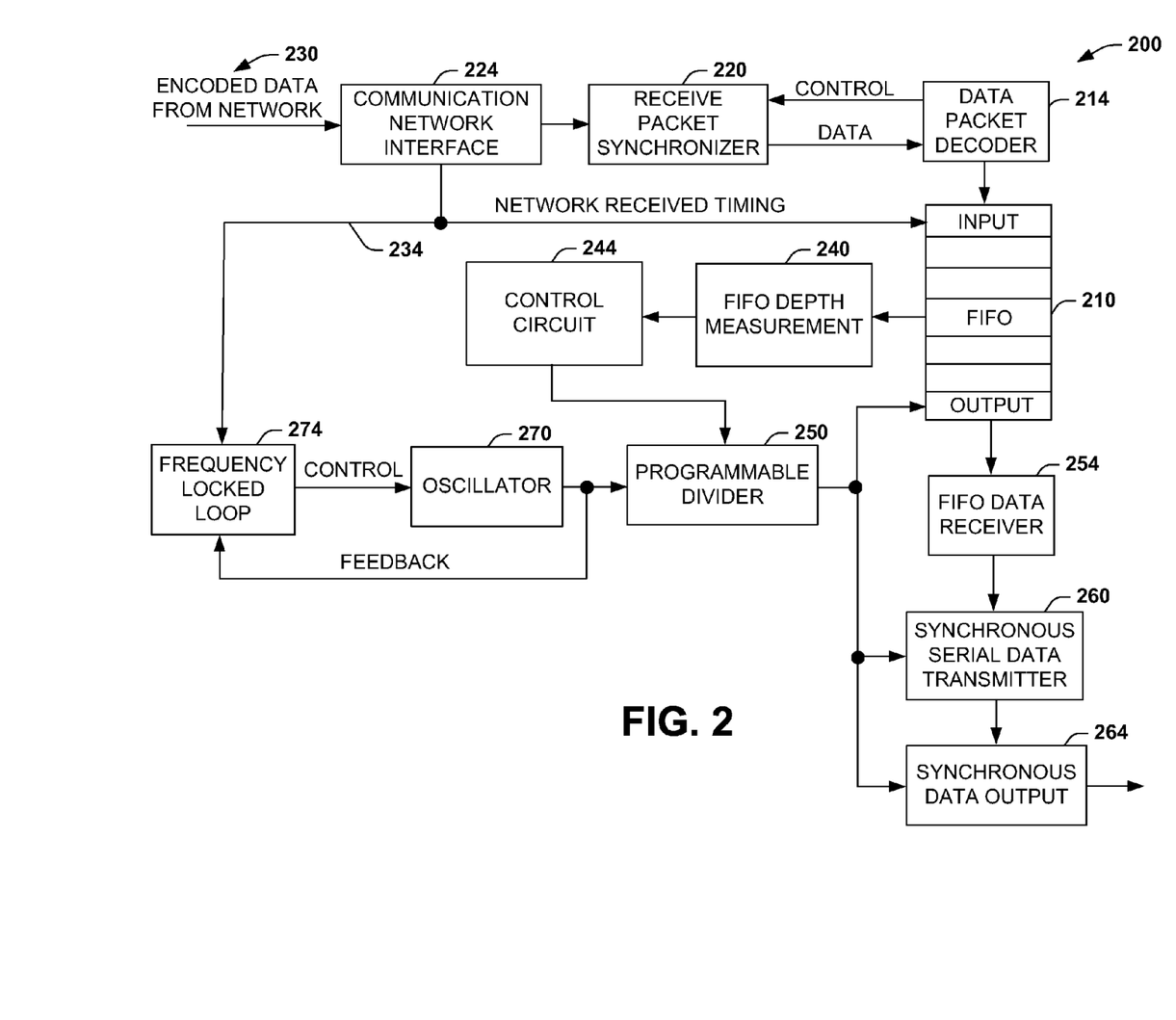
FIG. 2 illustrates an example of a decoder that employs a controllable buffer to provide a predictable coding delay for a communications network.

FIG. 2 illustrates an example of a decoder 200 that employs a controllable buffer 210 to provide a predictable coding delay for a communications network. In this example, the buffer 210, as described above with respect to FIG. 1 and throughout this disclosure, can be configured as a first-in-first-out (FIFO) having separate input and output controls for clocking data though the FIFO. The FIFO 210 receives decoded data from a data packet decoder 214 that exchanges control and data signals with a receive packet synchronizer 220. The receive packet synchronizer 220 receives data from a communication network interface 224, which receives encoded data from a network demonstrated at 230. The encoded data 230 can include network received timing 234 (e.g., recovered timing provided by an upstream encoder) to operate the FIFO input data receive rate and other controls in the decoder 200. A FIFO depth measurement 240 (e.g., depth parameter) is monitored at the FIFO 210 to provide a measure of the FIFO depth to a control circuit 244. The control circuit 244 can maintain the data depth in the FIFO 210 based on the measure of FIFO depth to provide predictable delay for the data received from the network at 230. In one example, the measure of FIFO depth corresponds to an average measurement FIFO depth (e.g., a time averaged value).

The control circuit 244 operates a programmable divider 250 controls a clock rate to the FIFO output, a FIFO data receiver 254, and the clock to the synchronous serial data transmitter 260. The synchronous serial data transmitter 260 in turn provides synchronous data output at 264. The programmable divider 250 receives a clock signal from an oscillator 270 and frequency locked loop (FLL) 274. The FLL 274 and oscillator 270 can be configured as part of a phase locked loop (PLL) exchanging control and feedback between the FLL and oscillator, respectively. It is noted that, although network received timing 234 is employed in this example, the decoder 200 can operate without such timing. For example, the decoder 200 could maintain synchronous network operations by controlling the depth of the FIFO 210 to a predetermined level (e.g., half full and half empty) and utilizing such control/monitoring to maintain synchronicity with respective transmitter sending the encoded data 230.

The communication network interface 224 can decode data and recover the network received timing 234 from an external network (e.g., from a single frequency network). It is noted that the network received timing is unrelated to the single frequency network RF carrier frequency.

As an example system, a 128 bit data packet (See, e.g., FIG. 5) can be transported over one 64 kilobits per second (kbps) DS0 channel in a T1 or E1 circuit. The network data can be de-multiplexed into its channels and then one channel is fed into the receive packet synchronizer 220. The synchronizer 220 synchronizes itself to the receive data packet (e.g., See FIG. 5) and determines where the individual data elements in the packet reside. For example, the synchronizer 220 is active during start-up. After initial synchronization is detected and if the network link is stable, synchronization can be subsequently deactivated. After synchronization is found, as long as the network link is stable, the synchronization status does not change. The synchronization status should be monitored in the event of a network disturbance and subsequent loss of synchronization in which case the synchronizer 220 becomes active again.

When a complete data packet is received, the data packet decoder 214 extracts the synchronous serial data from the data packet and writes this information into the FIFO 210. For example, the encoded data 230 can correspond to data traffic where the decoder 214 can receive a packet every 2 ms (milliseconds). A 128 bit packet over a 64 kbps channel results in a packet rate of 500 ms or a 2 ms packet inter-arrival time and the synchronous serial data contents can be written to the FIFO 210. The FIFO 210 can be read by the data receiver 254 and can then be converted to synchronous serial data at 260.

A synchronous serial data clock can be generated from the PLL (e.g., FLL 274 and oscillator 270) and programmable divider 250.

To provide a substantially precise and constant delay in the synchronous serial data decode process, the control circuit 244 can control the FIFO 210 depth. Referring briefly to FIG. 3 to provide more detail on the buffer 210, and before returning to the discussion of FIG. 2, an example FIFO 300 is demonstrated with 14 data elements of which 7 are filled. It is noted that the actual FIFO size is typically much larger. In the case of the decoder 200, the FIFO can be filled every 2 ms with the contents of a data packet and can be depleted at a constant "smooth rate" of 9.6 kbps data rate, for example. The decoder 200 is in balance when the long term average depletion rate and fill rate are substantially identical. Long term average depletion refers to when over many clock periods, where the amount of data entering the FIFO 210 is about the same as the amount of data being read from the FIFO. Since the 9.6 kbps synchronous serial clock is frequency locked to the network received timing 234 which is locked to incoming packet rate, the long term average FIFO depth can be maintained substantially constant.

The FIFO 210 is useful for SFN applications in that it provides a controllable delay. The delay can be changed in a continuous or discontinuous manner. To change the delay in a discontinuous manner, for example data can be artificially added (addition of delay) or removed (reduction in delay) to/from the FIFO 210. This type of delay change has the advantage of being fast with a disadvantage in a discontinuity of the dataflow which is a data error.

As another example, to change the FIFO delay in a continuous (e.g., hitless) manner, the FIFO depletion rate of synchronous data can be changed by adjusting the clock rate (e.g., 9.6 kbps). The FIFO fill level shown in FIG. 3 can change if there is a difference between the fill and depletion rates. If the depletion rate is greater than the fill rate, the FIFO fill level can decrease from that shown. If the fill rate is greater than the depletion rate the FIFO fill level can increase. If the depletion rate is indefinitely altered from nominal, at some point in time, the FIFO fill level could be greater than the overrun limit or less than the underrun limit resulting in an overflow or underflow condition. An overflow/underflow results in discontinuity of the dataflow. Such threshold limits can be assigned to the FIFO as shown in FIG. 3 so that corresponding corrective action can be taken to mitigate discontinuities in the dataflow.

The delay in the FIFO 210 is directly proportional to the fill level. By changing the depletion rate from nominal, the delay can be changed without any loss of data since the continuity of the dataflow is preserved. Also, the delay change granularity can be extremely small—e.g., fractions of a bit. Thus, the control circuit 244 can be configured to make a small change in the depletion rate for a small period of time resulting in delay change that is much less than a 9.6 kbps bit cell (e.g., about 104 μs). Since the fill and depletion of the FIFO depth can occur at different periodicities with different data amounts, the FIFO depth can be measured using averaging techniques. The averaging period should be much greater than the fill/depletion periodicity. For example, the FIFO depth measurement 240 can be implemented via a moving average filter.

The control circuit 244 monitors the average FIFO depth measurement 240. As an output, the control circuit controls a programmable divider 250 in the frequency lock loop that generates the data clock. The programmable divider 250 can provide precise changes to data clock rate. In one example, a PLL clock of 19.44 MHz can be divided down by 2025 to yield 9600 Hz. This division rate can be changed, for example, to 2024 or to 2026. This altered division rate can be in effect of 1 of N 9.6 kHz clock periods. Thus, for example, if the division rate is 2024 for 1 of 76 9.6 kHz clock periods, then the 9.6 kHz clock can be changed +6.5 PPM (parts per million) from nominal, e.g., Clock Rate from Nominal= (2025/2024−1)/76×1,000,000=6.5 PPM. As a further example, the control circuit 244 can provide clock adjustments once per second or at other predetermined time periods. For instance, a 6.5 PPM clock rate deviation for 1 second results in a delay change of 6.5 μs. The control circuit 244 alters the clock to keep a target delay in the FIFO 210. Thus, there can be a delay error if the actual delay is different from the target, wherein the control circuit 244 can attempt to "zero out" such error. Multiple channels of synchronous serial data can be transported over a channelized T1 or E1 circuit with a well known encode/decode delay. In the example given, 5 channels of 9600 kbps channels are being decoded by 200. Each channel can include an instantiation of the decoder 200 to provide the delay control as disclosed herein. This delay does not vary based on which particular T1 or E1 channel(s) are used nor does it vary based on when the encode/decode process is started up. Each instantiations of the encode/decode process thus can provide the same known and predictable delay as long as the target delay of each instantiation is the same.

Figure 4:
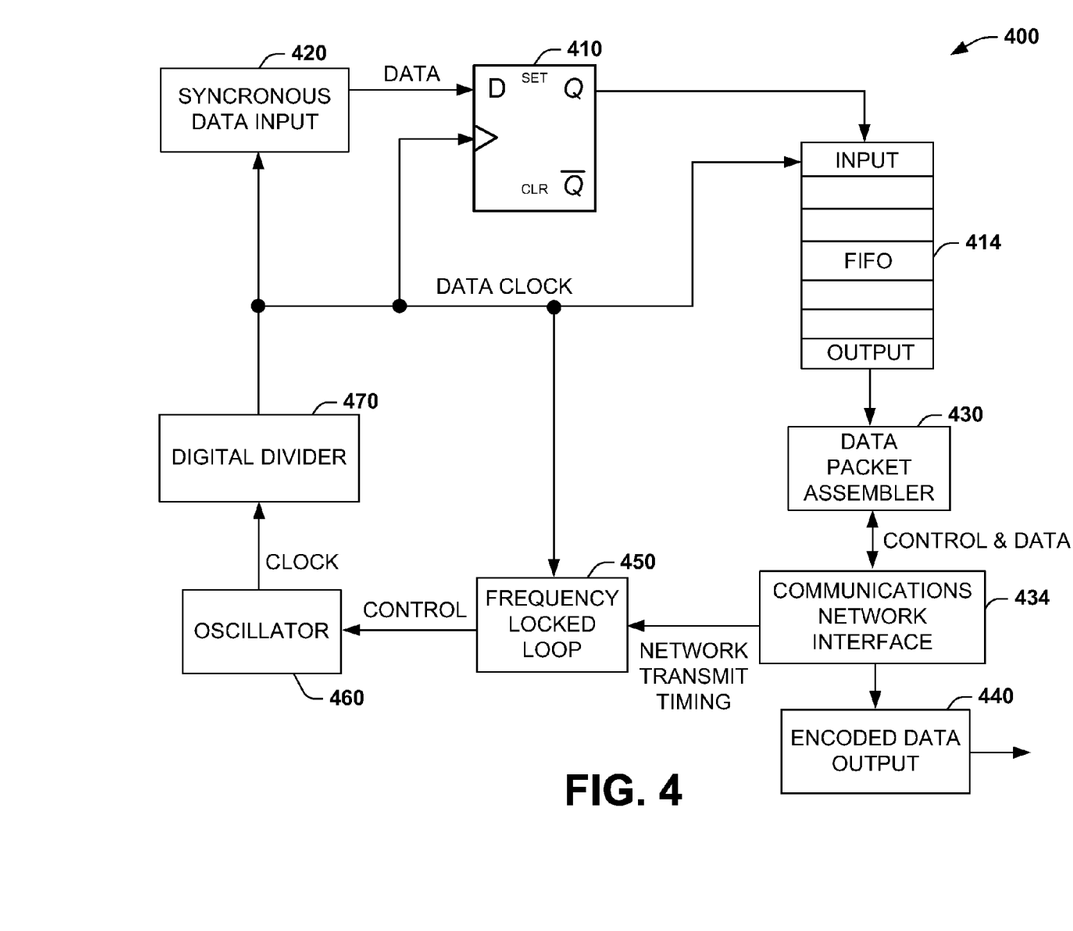
FIG. 4 illustrates an example of an encoder that employs a controllable buffer to provide a predictable coding delay for a communications network.

FIG. 4 illustrates an example of an encoder 400 that employs a controllable buffer to provide a predictable encoding delay for a communications network. Synchronous serial data has two core elements, a data signal and a clock signal. The clock is continuous and has a fixed frequency. The data changes on one edge (rising or falling) of the clock and is sampled on the opposite edge. For the encoder 400, the synchronous serial data can be sampled via a flip-flop 410. The output of flip-flop writes data into a first-in first-out (FIFO) data buffer 414. The FIFO 414 can be a data storage element to add delay in the processing of the synchronous serial data received from a synchronous data input 420. The output of the FIFO 414 can be read via a data packet assembler 430 and this data can be used to fill a data packet for a communications network interface 434 which provides encoded data output to a network at 440. Since the synchronous serial data can be of a fixed data rate, the data packet can be of a fixed size and be generated and sent at a fixed periodic rate.

After the data packet is assembled, it can be sent to the communication network interface 434. The communication network interface 434 can multiplex the data packet and transported it over the particular network type, an example being T1 or E1. The network interface 434 can have a transmit timing associated with it. This timing in the example of T1 is nominally 1.544 MHz and in the example of E1 is typically 2.048 MHz. This timing can be used to drive a frequency lock loop 450 that generates the synchronous serial data clock oscillator 460 and digital divider 470.

As one example, assuming a T1 network type, the 1.544 MHz clock signal can be divided down by 193 to yield 8000 Hz. This 8000 Hz can be used to drive or reference a 19.44 MHz phase lock loop (PLL). The 19.44 MHz PLL can be divided by 2025 to provide 9600 Hz and by 2430 to provide 8000 Hz. The 9600 Hz is then the serial data clock. The 8000 Hz can be fed back to the PLL control loop which consists of the FLL 450, oscillator 460, and divider 470. It is noted that 19.44 MHz is just one of many clock frequency examples that could be utilized.

As a further example, the FIFO 414 periodically empties when a "fresh" data packet is transmitted. For example, if five channels of 9.6 kbps synchronous serial data are to be transported over one DS0 (64 kbps) T1 or E1 channel, if the data packet size is 128 bits, the packet can be sent every 2 ms (64 kbps/128 bits=500 packets per seconds or 2 ms per packet). This data packet can have up to 100 bits of 9.6 kbps data or 20 bits per channel (20=100/5). The remaining 28 bits can be used for overhead such as header information and metadata. On average, a 9.6 kbps channel can have 19.2 bits of data every 2 ms. The actual channel data fill level can be an integer and can vary from 19 or 20 bits of data with a 5 to 1 ratio of 19 bit versus 20 bit packets. Using this method, the FIFO 414 can be emptied (e.g., drained) in a periodic and predictable manner resulting in a corresponding delay characteristic of the encoding process that is predictable and known a priori.

As yet another example, the encoder 400 can employ a digital Project 25 (P25) standard P25 over SFN, in which the P25 data traffic is transported from the encoder site to multiple RF transmitter sites (e.g., including the decoder system 200 of FIG. 2). The approach disclosed herein helps to ensure that both the encoding and decoding delay of the dataflow is predictable and precise for each instantiation of the telecommunication transport from control site (encoder system 400) to the RF transmitter site.

Figure 5:
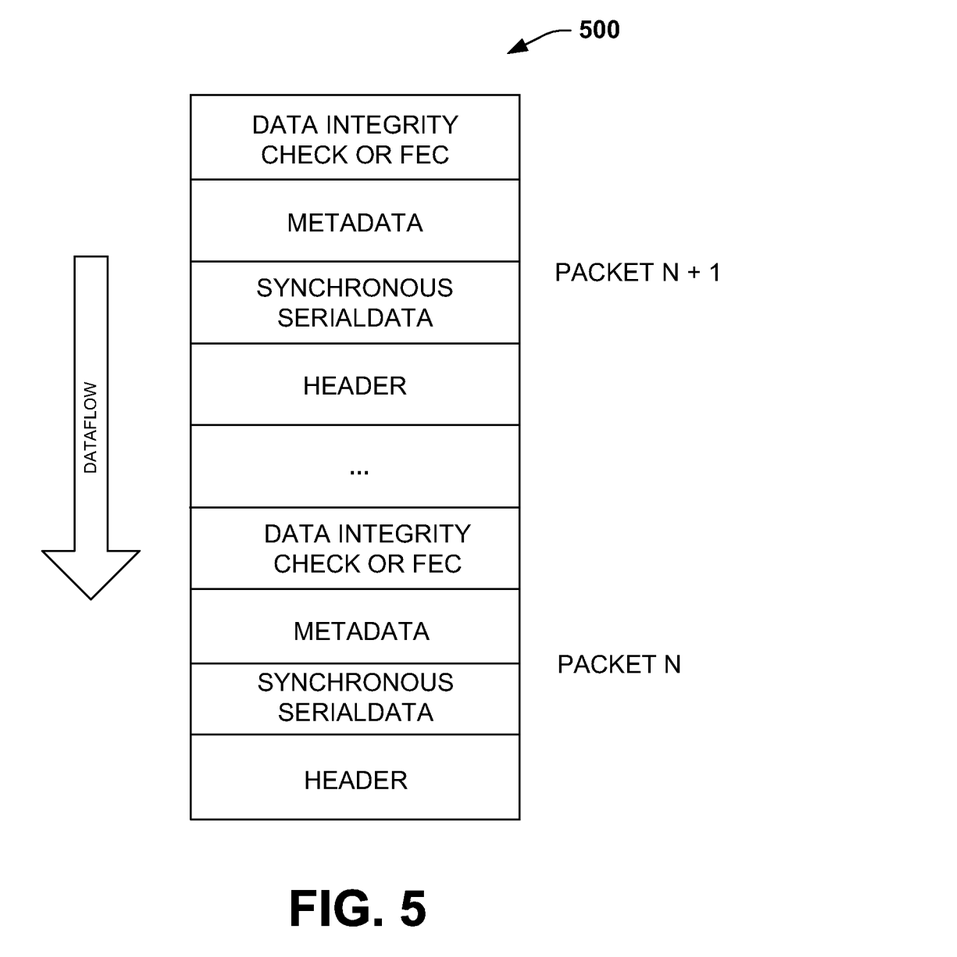
FIG. 5 illustrates an example data packet generated by the example encoder of FIG. 4.

FIG. 5 illustrates an example data packet generated by the example encoder of FIG. 4. As shown, the data packet 500 can include multiple packets having such fields as headers, synchronous serial data, metadata, data integrity data, and so forth. In an example, the data packet 500 can be used to assemble and multiplex in data from multiple FIFOs, e.g., multiple channels or streams of synchronous serial data are to be transported over the telecommunication link. This can include providing a header and structure for the data. The header and structure provide a means for the far-end receiver to synchronize itself to the respective packet. The data packet 500 can also multiplex in any low speed metadata such as contract closures or system status information, for example. This can include providing for data integrity checks or forward error correction (FEC) for the packet, for example.

Figure 6:
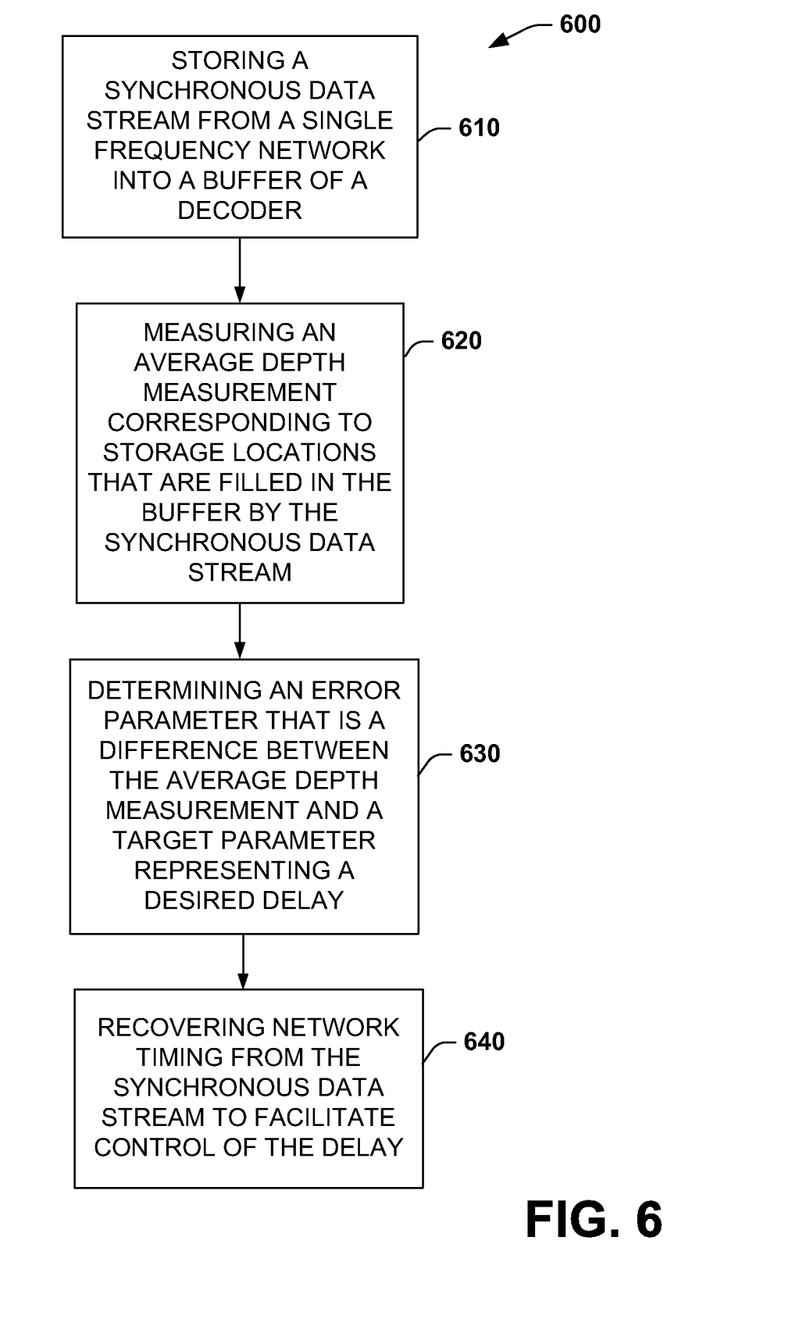
FIG. 6 illustrates an example method for providing a predictable coding delay for a communications network.

In view of the foregoing structural and functional features described above, an example method will be better appreciated with reference to FIG. 6. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an IC or a controller, for example.

FIG. 6 illustrates an example method for providing a predictable coding delay for a communications network. Proceeding to 610, the method 600 includes storing, by a decoder (e.g., decoder 150 of FIG. 1), a synchronous data stream from a single frequency network into a buffer (e.g., buffer 160 of FIG. 1). At 620, an average depth measurement is monitored. The average depth measurement can relate to storage locations that are filled in the buffer by the synchronous data stream. For example the average depth measurement, which can be proportional to a delay in the buffer, can be monitored by a controller (e.g., by a controller control circuit 170 of FIG. 1). At 630, the method 600 includes determining an error parameter that is a difference between the average depth measurement and a target parameter representing a desired delay. The method 600 may also include reducing the error parameter to control the delay with sufficient precision and predictability. At 640, the method includes recovering network timing from the synchronous input data stream (e.g., received via a single frequency network) to facilitate controlling the delay. The method 600 can also include emptying an encoder first-in first-out (FIFO) circuit in a periodic manner resulting in a corresponding delay characteristic of an encode process that is predictable and known a priori. The predictability of the delay for the encode process further affords increased predictability in the delay at the decode process as disclosed herein.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A decoder, comprising:
a buffer configured to incrementally transport a synchronous data stream through a path of the decoder; and
a control circuit configured to control a depth parameter associated with the buffer and to provide a substantially predictable delay of the synchronous data stream through the path of the decoder, wherein the control circuit derives synchronous network timing by monitoring the depth parameter according to an average fill level of the buffer over time,
wherein the substantially predictable delay is based on a periodic emptying rate of an encoder buffer of an encoder that provides the synchronous data stream.

2. The decoder of claim 1, wherein the buffer is a first-in first-out (FIFO) circuit configured to clock the synchronous data stream through the path of the buffer.

3. The decoder of claim 1, wherein the depth parameter is maintained such that a fill rate and a depletion rate of the buffer are at about equal rates.

4. The decoder of claim 3, wherein the depth parameter is a fill level indicating a number of storage locations in the buffer that have received at least a portion of the synchronous data stream.

5. The decoder of claim 4, wherein the fill level is assigned a threshold value that includes at least one of an underrun limit, a minimum fill level, a maximum fill level, or an overrun limit.

6. The decoder of claim 1, wherein the predictable delay is increased by moving data into the buffer or decreased by removing data from the buffer in an asynchronous manner to buffer clock operations.

7. The decoder of claim 1, wherein the substantially predictable delay is increased or decreased by adjusting clock frequencies to the buffer.

8. The decoder of claim 1, wherein the decoder is configured as part of a system, wherein the system further comprises the encoder that employs the encoder buffer to provide the substantially predictable delay for data packets that are transmitted to the decoder over a single frequency network (SFN).

9. The system of claim 8, the encoder further comprising a frequency locked loop and a phased locked loop to generate timing for the encoder buffer and provide the substantially predictable delay for the data packets.

10. A decoder, comprising:
a buffer configured to incrementally transport a synchronous data stream through a path of the decoder;
a control circuit configured to control a depth parameter associated with the buffer and to provide a substantially predictable delay of the synchronous data stream through the path of the decoder; and
an average depth measurement component that provides the control circuit an average depth measurement of storage locations in the buffer, the control circuit adjusts clock frequencies to the buffer to control the predictable delay based on the average depth measurement, wherein the substantially predictable delay is based on a periodic emptying rate of an encoder buffer of an encoder that provides the synchronous data stream.

11. The decoder of claim 10,
wherein the control circuit determines a target delay for the buffer and determines a delay error that is a difference between a measured delay for the buffer and the target delay,
wherein the control circuit mitigates the delay error by adjusting the clock frequencies to the buffer based on the average depth measurement.

12. The decoder of claim 11, further comprising a programmable divider that is controlled by the control circuit to adjust the clock frequencies to the buffer.

13. The decoder of claim 12, further comprising a frequency locked loop that receives network timing recovered from an input data stream of a single frequency network, the frequency locked loop being configured to generate input timing for the programmable divider.

14. The decoder of claim 13, further comprising an oscillator configured to generate the input timing for the programmable divider based on a control signal from the frequency locked loop.

15. A device, comprising:
a decoder configured to decode synchronous data packets from a single frequency network (SFN);
a first-in first-out (FIFO) circuit configured to introduce a substantially predictable delay for the synchronous data packets received from the decoder; and
a control circuit configured to adjust a depth parameter that is proportional to the predictable delay, wherein the depth parameter is based on an average depth measurement of storage locations in the FIFO circuit that currently store the synchronous data packets, wherein the substantially predictable delay is based on a periodic emptying rate of an encoder buffer of an encoder of the synchronous data packets.

16. The device of claim 15, further comprising a frequency locked loop to provide timing for the synchronous data packets that pass through the FIFO circuit.

17. The device of claim 15, wherein the control circuit adjusts the depth parameter such that a fill rate and a depletion rate for the FIFO circuit are maintained about equal as averaged over time.

18. A method, comprising:
storing a synchronous data stream from a single frequency network into a buffer of a decoder;
measuring an average depth measurement corresponding to storage locations that are filled in the buffer by the synchronous data stream, the average depth measurement being proportional to a delay in a path through the decoder;
determining an error parameter that is a difference between the average depth measurement and a target parameter representing a desired delay;
reducing the error parameter in order to control the delay predictably; and
emptying an encoder first-in first-out (FIFO) circuit in a periodic manner resulting in a corresponding delay characteristic of an encode process that is predictable and known a priori.

* * * * *